(12) United States Patent
Cengil et al.

(10) Patent No.: US 10,449,829 B2
(45) Date of Patent: Oct. 22, 2019

(54) METHOD AND DEVICE FOR OPERATING A CLIMATE CONTROL DEVICE OF A VEHICLE

(71) Applicant: VOLKSWAGEN AKTIENGESELLSCHAFT, Wolfsburg (DE)

(72) Inventors: Sükrü Cengil, Burgwedel (DE); Anna Braun, Braunschweig (DE); Jan Peter Herdey, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 156 days.

(21) Appl. No.: 15/666,954

(22) Filed: Aug. 2, 2017

(65) Prior Publication Data
US 2018/0037087 A1 Feb. 8, 2018

(30) Foreign Application Priority Data
Aug. 3, 2016 (DE) .................. 10 2016 114 354

(51) Int. Cl.
*B60H 1/00* (2006.01)
*B60K 37/06* (2006.01)
(Continued)

(52) U.S. Cl.
CPC ..... *B60H 1/00985* (2013.01); *B60H 1/00842* (2013.01); *B60H 1/00864* (2013.01); *B60H 1/00871* (2013.01); *B60K 35/00* (2013.01); *B60K 37/06* (2013.01); *G06T 11/001* (2013.01); *B60K 2370/11* (2019.05); *B60K 2370/111* (2019.05); *B60K 2370/141* (2019.05); *B60K 2370/146* (2019.05); *B60K 2370/1438* (2019.05); *B60K 2370/1442* (2019.05);
(Continued)

(58) Field of Classification Search
CPC .................................................. B60H 1/00985
USPC .......................................................... 715/772
See application file for complete search history.

(56) References Cited

U.S. PATENT DOCUMENTS

| 6,009,355 A | * | 12/1999 | Obradovich | ....... B60G 17/0195 340/815.4 |
| 2002/0021306 A1 | * | 2/2002 | Gehrke | ............. B60H 1/00985 715/716 |

(Continued)

FOREIGN PATENT DOCUMENTS

| DE | 19735317 A1 | 2/1999 |
| DE | 102007023502 A1 | 12/2007 |
| DE | 102012016109 A1 | 2/2014 |

*Primary Examiner* — William D Titcomb
(74) *Attorney, Agent, or Firm* — Barnes & Thornburg LLP (57) ABSTRACT

A method for operating an air-conditioning apparatus of a vehicle wherein the air-conditioning apparatus has at least three display modes including a status mode, a transition mode, and a setting mode. A current value of a setting parameter of the air-conditioning apparatus and whether an operating intention of a user exists are detected. If no operating intention is detected, the status mode is activated. If an operating intention is detected, the transition mode or the setting mode is activated. Depending on the activated display mode, graphical data of a graphical representation of an interior of the vehicle is generated and displayed so the status mode is activated. The representation of the interior includes a display element for outputting the currently set value of the setting parameter.

25 Claims, 6 Drawing Sheets

(51) Int. Cl.
  *G06T 11/00* (2006.01)
  *B60K 35/00* (2006.01)
  *G06F 3/0484* (2013.01)
  *G06F 3/0488* (2013.01)
(52) U.S. Cl.
  CPC .... *B60K 2370/152* (2019.05); *B60K 2370/16* (2019.05); *B60K 2370/52* (2019.05); *G06F 3/04847* (2013.01); *G06F 3/04883* (2013.01); *G06T 2200/24* (2013.01)

(56) References Cited

U.S. PATENT DOCUMENTS

| | | | | |
|---|---|---|---|---|
| 2008/0196878 A1* | 8/2008 | Errington | ........... | B60H 1/00764 165/203 |
| 2008/0264079 A1* | 10/2008 | Takenaka | ........... | B60H 1/00985 62/127 |
| 2010/0045624 A1* | 2/2010 | Hisatsugu | ........... | B60H 1/00985 345/173 |
| 2010/0107110 A1* | 4/2010 | Mirza | ................ | B60H 1/00985 715/777 |
| 2010/0145485 A1* | 6/2010 | Duchene | .............. | G05B 19/042 700/90 |
| 2011/0183596 A1* | 7/2011 | Fischer | .............. | B60H 1/00964 454/75 |
| 2011/0296340 A1* | 12/2011 | Nakagawa | ......... | B60H 1/00985 715/783 |
| 2013/0047112 A1* | 2/2013 | Waller | ............... | B60H 1/00985 715/771 |
| 2013/0249829 A1* | 9/2013 | Hitosuga | ................. | G06F 3/041 345/173 |
| 2014/0123064 A1* | 5/2014 | Matsumoto | ........... | B60K 35/00 715/810 |
| 2015/0283881 A1* | 10/2015 | Missall | .............. | B60H 1/00985 165/41 |
| 2015/0286366 A1* | 10/2015 | Le Pors | .................... | G01S 7/04 345/173 |
| 2015/0378513 A1* | 12/2015 | Fontaine | ............... | G06F 3/0412 345/173 |
| 2016/0193895 A1* | 7/2016 | Aich | .................. | B60H 1/00657 165/202 |
| 2017/0021693 A1* | 1/2017 | Mochizuki | ............... | B60H 3/02 |
| 2017/0120724 A1* | 5/2017 | Furse | ................. | B60H 1/00985 |
| 2017/0291469 A1* | 10/2017 | Romero Regalado | ....................... | B60H 1/00871 |
| 2017/0368909 A1* | 12/2017 | Choi | ..................... | B60Q 5/005 |
| 2018/0001734 A1* | 1/2018 | Faust | ................. | B60H 1/00064 |

* cited by examiner

METHOD AND DEVICE FOR OPERATING A CLIMATE CONTROL DEVICE OF A VEHICLE

PRIORITY CLAIM

This patent application claims priority to German Patent Application No. 10 2016 114 354.5, filed 3 Aug. 2016, the disclosure of which is incorporated herein by reference in its entirety.

SUMMARY

Illustrative embodiments relate to a method and an operating apparatus for operating an air-conditioning apparatus of a vehicle, wherein the air-conditioning apparatus has at least three display modes, namely a status mode, a transition mode and a setting mode.

BRIEF DESCRIPTION OF THE DRAWINGS

The disclosed embodiments will now be explained with reference to the drawings.

DETAILED DESCRIPTION

In a vehicle, in particular in a motor vehicle, provision is made of a multiplicity of devices which are intended to improve safety and convenience for the vehicle occupants during travel. They include, for example, driver assistance systems, lighting devices for the external surroundings or the interior of the vehicle, air-conditioning devices or multimedia entertainment systems of the vehicle. As the number and complexity of the individual components increase, there is a growing challenge to make the operation of these devices as simple as possible for the driver or other vehicle occupants and to output information about the state of the system in the vehicle in an easily detectable manner. In modern vehicles, therefore, in many cases use is made of multifunctional operating systems comprising one or more multifunctional displays and operating elements which can be used to operate the diverse devices contained in the vehicle and to output information. In this case, operation is supported or conducted by means of the information reproduced on the multifunctional display. Furthermore, via the operating system it is possible to choose what information is intended to be displayed on the multifunctional display.

One vehicle device which has a significant influence on the traveling experience for the vehicle occupants is the ventilation device. The air in the relatively small interior volume of the vehicle is susceptible to pollution with odors and harmful substances, in particular including particles from the surroundings of the vehicle. As a result of the air swirled up by the vehicle and other road users during travel, for example, dust, pollen or dirt particles can occur to an intensified extent in the road area and enter the vehicle through open windows or the ventilation device. Furthermore, emissions from other road users can have the effect that unpleasant odors and harmful substances enter the vehicle. To improve the air quality in the vehicle interior, therefore, a multiplicity of different devices may be available in a modern vehicle. However, in the existing systems it is often difficult for the user to recognize the current state of the system, the extent to which the change in air quality has progressed and what devices are active. Furthermore, the operation of a ventilation device often presupposes multiple or complicated operations.

DE 197 35 317 A1 describes a vehicle heating or air-conditioning system having an on-board monitor which outputs a display for setting the supplied quantity of air and temperature stratification relative to defined zones of a vehicle passenger. In this case, arrows are represented, the length of which corresponds to a specific quantity of air.

DE 10 2007 023 502 A1 describes a display and operating unit for the air-conditioning system of a vehicle, wherein person symbols are represented, the head, trunk and feet of which respectively symbolize air-conditioning cells of the individual vehicle occupants. Furthermore, arrows directed at the air-conditioning cells are represented. Setting of the air-conditioning system can be carried out on the basis of these symbols.

In the case of the operating apparatus for setting an air-conditioning apparatus of a vehicle as described in DE 10 2012 016 109 A1, a graphical representation of the interior of the vehicle is displayed. The graphical representation comprises switching symbols which represent the inflow direction and rate and/or temperature of the inflowing air and at which inputs can be carried out.

Therefore, the disclosed embodiments provide a method and an operating apparatus for operating an air-conditioning apparatus of a vehicle which allow the user, particularly rapidly and simply, to carry out settings and to detect comprehensively information about the operation of the air-conditioning apparatus.

In the method of the type mentioned in the introduction, a current value of a setting parameter of the air-conditioning apparatus is detected and the fact of whether an operating intention of a user exists is detected. If no operating intention is detected, the status mode is activated. If an operating intention is detected, the transition mode or the setting mode is activated. Depending on the activated display mode, graphical data of a graphical representation of an interior of the vehicle are generated and displayed such that if the status mode is activated, the representation of the interior comprises a display element by which the currently set value of the setting parameter is output. If the transition mode is activated, the representation of the interior comprises a settability display element. If the setting mode is activated, the representation of the interior comprises an operable setting element.

By virtue of the fact that the displayed representation for operating the air-conditioning apparatus is formed depending on the activated display mode, operation can be adapted to the respective operating situation and the user can at any time easily detect what operating possibilities currently exist. For this purpose, the fact of whether an operating intention of the user was detected is taken into account. Furthermore, the disclosed method, when detecting an operating intention, allows different manifestations of the operating intention to be differentiated and taken into account. Either the transition mode or the setting mode can be activated depending on such a manifestation of the operating intention. Furthermore, provision can be made for the transition mode to be activated proceeding from the status mode and/or for the setting mode to be activated proceeding from the transition mode, depending on the manifestation of the operating intention. Moreover, if an operating intention is no longer detected, it is possible to change to the status mode proceeding from the setting mode or from the transition mode.

The display element, the settability display element and the setting element can be embodied differently from one another. This allows a differentiation of the different display modes that is recognizable particularly clearly for a user.

The interior representation then comprises the display element, the settability display element and/or the setting element in the different display modes, wherein these elements can comprise by the display separately or combined in various ways. The representation of the interior, if the status mode is activated, can comprise only the display element and neither the settability display element nor the setting element; the representation of the interior, if the transition mode is activated, can comprise only the settability display element, if appropriate in combination with the display element; the representation of the interior, if the setting mode is activated, can comprise the setting element, if appropriate in combination with the display element and/or the settability display element.

By virtue of the fact that the display, settability display and setting elements are embodied such that a user can differentiate the different modes of the display, it is always clearly recognizable to the user when operation is possible and how this operation can be effected.

In the disclosed method, provision is made for not just inserting operable elements after the detection of an operating intention, rather provision is made of at least three different display modes which allow gradations between a pure display of the current status, a display of the operability of different elements and the display of operable elements of a user interface. However, provision is made for the operable setting element to be displayed only in the setting mode, and for neither the display element nor the settability display element to be operable in this case.

Upon the transition between different display modes, the representation of the interior can be changed by means of an animation, wherein a transition between the representation of the display element, the settability display element and/or the setting element is carried out. Furthermore, provision can be made for graphical elements to be represented not only in the display mode directly assigned to them, but also in another display mode. Mixed forms of the display modes can thus be formed. By way of example, the representation in the setting mode can also comprise a display element and/or a settability display element.

The current value of a setting parameter of the air-conditioning apparatus is detected in a manner known per se. By way of example, this value can concern an intensity, temperature, direction and/or some other characteristic property of an air flow. Furthermore, the value can concern a material composition of an air flow, that is to say, for example, information about particles, scents, harmful substances contained in the air, a gas composition or similar parameters. The value can additionally concern the opening and closing of a ventilation flap, and settings of a further function for air-conditioning. The detected value can be provided, for example, by a device of the vehicle, in particular by the air-conditioning apparatus, or the detection can be effected by means of sensors. In this case, the current value can be predefined in various ways known per se, for example, as a predefined initial value or by a setting carried out previously.

The operating intention can likewise be detected in various ways known per se. A gesture by the user can be detected, from which an imminent operating action can be deduced. For this purpose, for instance, it is possible to detect entrance into a detection region or a touch of a surface, it is possible to detect a first operating action as preparatory signaling of an operating intention, for example, a preparatory gesture in the detection region or on a touch-sensitive surface, or it is possible to recognize that an operating intention is present on the basis of further data from devices of the vehicle, for example, in the case of a specific command detected by means of a voice control. It can be provided in this case that the operating intention can be detected in at least two manifestations, for example, on the basis of different criteria, and that different display modes, in particular the transition mode or the setting mode, are assigned to the differently manifested operating intentions. In this case, the transition mode or the setting mode is activated depending on the detected operating intention or the manifestation of the detected operating intention.

The status mode, which is activated if no operating intention is detected, serves for comprehensive and fast information for the user, in particular concerning the current settings of the air-conditioning apparatus. The display element—provided for this purpose—of the representation of the vehicle interior serves in this case for outputting the currently set value of the setting parameter. A plurality of display elements can be provided, which are assigned to different setting parameters. In this case, the currently set value can be output in a manner known per se, for example, by means of a symbol, a scale, a numeric element or text element.

The transition mode primarily serves to inform the user about what setting possibilities are potentially available to the user. For this purpose, the representation of the interior comprises a settability display element, which is suitable for displaying to the user in an easily detectable manner what setting possibilities are available to the user. The settability display element can be represented in addition to the display element or it is possible to generate an animated representation such that the display element transitions or "transforms" into the settability display element.

In this case, it is provided that no settings can be performed by means of the settability display element. The display of the setting possibilities by the settability display element can be effected, for example, by highlighting of a graphical element, addition or removal of represented elements and/or by a further adaptation of the representation vis-à-vis the status mode. By way of example, the display element can be replaced by the settability display element or both elements can be displayed simultaneously.

In the setting mode, finally, the user can perform an operating action on the basis of an operable setting element. The value of a setting parameter assigned to the setting element is changed as a result. The setting element can be formed as an element of a graphical user interface in a manner known per se and, in this case, in the representation, replace or be displayed in addition to the previously displayed display element and/or settability display element. Here, too, it is possible to output an animated transition in which the settability display element transitions into the setting element. The representation is effected in the setting mode in the manner of a graphical user interface.

By virtue of the fact that the display element, the settability display element and the setting element are embodied differently from one another, the user can recognize three stages in which the user arrives at an input: before an operating intention is detected, the currently set value of the setting parameter is output. After an operating intention has been detected, a settability display element displays what elements of the representation will be operable, in particular what values of parameters can be set in what regions of the graphical user interface if the setting mode is activated. By way of example, the settability display element can be assigned to a settable device and/or to a settable parameter of the air-conditioning apparatus within the display.

In accordance with at least one configuration of the disclosed method, if the setting mode is activated, an input is detected on the basis of the setting element and a control signal for the air-conditioning apparatus is generated on the basis of the input. In this case, a ventilation element of the air-conditioning apparatus is set on the basis of the control signal.

In this case, the input is detected in a manner known per se by methods known for graphical user interfaces. By way of example, an input can be detected by means of a touch-sensitive surface. Furthermore, an operation can be effected by means of a rotary/pushbutton controller, a touchpad, a mouse or some other input device. Furthermore, gestures by the user in space and voice commands can be detected.

The input is detected on the basis of the setting element, which is displayed in the setting mode. By way of example, the user's input can be supported by the setting element in such a way that a rotation or translation of the setting element is performed or at least indicated. Furthermore, a further change in the representation of the setting element can support the input.

The currently set value of the setting parameter assigned to the setting element is changed by the input. This relates to a ventilation element of the air-conditioning apparatus. In this case, a plurality of ventilation elements with a plurality of setting parameters can be provided, and also a plurality of setting parameters for the same ventilation element or a group of ventilation elements. A special important component of the air-conditioning apparatus is set by the control of the ventilation elements.

The control signal can change, for example, a value of a setting parameter, for example, a temperature, an intensity and/or a direction of an air flow generated by the ventilation element. Alternatively or additionally, it is possible to set a parameter for a device for filtering or fragrancing the air or for changing the material composition of the air in some other way.

In accordance with at least one disclosed embodiment, an open state and a closed state of the ventilation element are set on the basis of the control signal. A basic parameter of the ventilation element can be set as a result.

In surroundings with highly contaminated ambient air it is important to enable the ingress of air from the exterior into the vehicle to be controlled or avoided. It is desirable for this purpose to be able to control the open or closed state of the ventilation element. It can be provided that ventilation flaps linking the exterior to the interior of the vehicle can be opened and closed. In many cases this is possible independently of the general activity of the air-conditioning apparatus, that is to say that a ventilation flap can be open even with the ventilation deactivated per se. By means of the disclosed method, it can now be provided that the user can open or close the ventilation flap, depending on the requirements of the respective situation and the user's desires.

In accordance with a further disclosed embodiment, if the status mode is activated, the display element is formed such that the open or closed state of the ventilation element is output. As a result, the user can recognize rapidly and simply what state of the ventilation element is currently present.

By way of example, it is possible to provide different symbols representing the different states. For example, it is possible to represent a line if the ventilation element is in the closed state, and an arrow, an arrowhead or an arrow-like shape if the ventilation flap is open. In this case, it is possible to symbolize the fact that an air flow is possible through the ventilation flap in the open state.

In accordance with one development, the display element, the setting element and the settability display element are arranged in each case at a position of the representation which corresponds to the actual position of the ventilation element in the vehicle. As a result, the user can detect rapidly and intuitively to what ventilation element the respective elements of the representation relate.

The position of the display element, of the setting element and/or of the settability display element can be chosen here such that the user can identify the respectively settable or displayed ventilation elements by a comparison of the representation of the vehicle interior with the actual interior.

In this case, the elements of the representation which are assigned to the ventilation elements can be represented in a manner adjoining the respective region of the ventilation elements. They can furthermore be superimposed on the position of the respectively assigned ventilation element and/or be displayed in a direct vicinity.

The representation of the vehicle interior can furthermore comprise the ventilation elements themselves, for example, by means of symbols and/or a representation of the ventilation elements in a more or less highly abstract form.

In accordance with at least one disclosed embodiment, the value of the setting parameter is output by the display element on the basis of a color and/or a longitudinal extent. As a result, the user can detect the value rapidly and intuitively.

In this case, there may be a proportionality between the longitudinal extent and the value of the setting parameter, wherein there need not be a strict, direct proportionality. Furthermore, a color scale can be used, wherein different values are represented by different colors. By way of example, a temperature can be represented by means of a color scale, wherein blue stands for cold and red stands for hot. In this case, it is possible to use color transitions for representing intermediate values. Furthermore, by way of example, a longitudinal extent can be represented on the basis of an arrow having a specific length. In this case, a longer length can represent an air flow of higher intensity. Furthermore, a width extent and/or a direction can be used to represent a spatial distribution.

The representation of the settability display element and/or of the setting element can also be effected in an analogous manner. Furthermore, the open and closed states of a ventilation element can be displayed as described.

In accordance with a further disclosed embodiment, the transition mode is activated if the detected operating intention comprises an approach of an actuation object within a detection space. As a result, the operating intention can be detected if the user moves with the actuation object in a specific region.

Provision can be made for the detection space to be situated in a vicinity of an input unit, for example, in the region of a touch-sensitive surface, for example, a touchscreen. In this case, the transition mode can be activated if the user brings the actuation object in proximity to the touch-sensitive surface.

Provision can be made for the setting mode to be activated if the detected operating intention comprises a touch of a surface. Furthermore, the setting mode can be activated if the touch is effected in a specific region of the surface. In this case, the transition mode can be activated if the actuation object approaches the surface, and the setting mode can be activated if the actuation object reaches and touches the surface, if appropriate in a specific region and/or with a specific pressure.

In this case, "actuation object" is understood to be means used for performing an operating action. The actuation object can be a finger or a hand of the user.

The detection region can be determined in various ways, wherein provision is made for the carrying out of an operating action typically to presuppose entrance into the detection region. In this case, entrance into the detection region can be detected in a manner known per se by means of a proximity sensor system. The latter can comprise, for example, a reflected light barrier comprising at least one illuminant for emitting electromagnetic detection radiation into the detection region and a receiving element for detecting a portion of the detection radiation that is scattered and/or reflected at the actuation object. It can be embodied such that the actuation object is recognized in the detection region on the basis of the intensity of the received detection radiation. The proximity sensor system can furthermore comprise different illuminants for the different detection zones, which each emit electromagnetic detection radiation into the respective detection zone. Furthermore, a modulation apparatus for modulating the emitted detection radiation can be provided, such that the detection radiation emitted into the individual detection zones differs in each case with regard to its modulation. In this case, the proximity sensor system can also comprise an analysis unit embodied such that the received reflected and/or scattered detection radiation can be analyzed with regard to its modulation to determine in what detection zone the detection radiation was scattered or reflected at an actuation object. A spatially resolved proximity sensor system can be provided in this way.

In at least one disclosed embodiment, provision is made for the transition mode to be activated if an entrance of an actuation object into a detection space in front of a touch-sensitive surface of a touchscreen is detected, and for the setting mode to be activated if a touch of the touch-sensitive surface by the actuation object is detected. If the actuation object is not situated in a detection space and does not touch the touch-sensitive surface, the status mode is activated. By means of this sequence of operations in which different display modes are activated in each case, the typical progression of an operation is elucidated by means of a graphical user interface in a plurality of operations.

In accordance with one development, if the transition mode is activated, the settability display element is represented together with the display element, wherein the settability display element is arranged on the display element. As a result, the settability of a setting parameter can be represented in an easily detectable manner.

In this case, the settability display element can be formed such that its assignment to the display element is clearly signaled. By way of example, if the display element comprises an arrow shape, the settability display element can be formed such that it likewise wholly or partly follows an arrow shape.

In this case, the settability display element itself is not yet operable, but rather merely signals the possibility of carrying out a setting of an assigned setting parameter by means of an operating action, although only after the activation of the setting mode.

In accordance with at least one disclosed embodiment, the setting mode is activated if the operating intention comprises an actuation action. A clear separation between the transition mode and the setting mode can be achieved as a result.

In this case, the actuation action can be detected in various ways known per se. It establishes a relation to a settability display element displayed in the transition mode, for example, by a spatial assignment to the position of the display of the settability display element within the representation. The actuation action for activating the setting mode can comprise, for example, tapping a touchscreen in the region of a settability display element displayed in the transition mode, a keystroke, a gesture or a voice input; furthermore, it is possible for further actuation actions to be provided.

In accordance with a further disclosed embodiment, if the setting mode is activated, an approach position of an actuation object relative to the representation of the interior is determined and the operable setting element is formed on the basis of the approach position. As a result, the representation in the setting mode can be effected such that the user can immediately recognize what settings are possible at what positions of the representation of the interior.

A spatially resolved proximity sensor system is used for this purpose, wherein the spatial resolution allows detection of an approach within specific regions of the representation. By way of example, it is possible to detect when the user approaches a specific setting element. Furthermore, it is possible to detect when the user approaches a specific position of the interior representation to which a specific element of the air-conditioning apparatus, in particular a ventilation element, is assigned.

In this case, the setting element can be formed in a manner known per se. Provision is made for the represented setting element to differ depending on whether or not an approach of the actuation object to a specific position was detected. Provision can be made for the representation of a setting element to change if the actuation object enters a specific region in a vicinity of the represented setting element. In this case, the representation of the setting element can be changed in various ways, for example, by a change in the color and/or shape of the setting element and/or other highlightings. Furthermore, a dynamic effect can be provided, wherein a temporally variable representation is generated.

Furthermore, it can be provided that a setting of a specific setting parameter can be carried out depending on the approach position. This can be provided if a plurality of values of setting parameters can be changed and the approach position is taken as a basis for determining which of the setting parameters the user presumably wants to set.

In at least one disclosed embodiment, the setting element can be displayed in a specific region of a touchscreen in the event of detection of the actuation object approaching the region or touching the region of the touchscreen. At the same time, in this case, the display element and/or the settability display element can be displayed in a further region of the touchscreen, while no setting element is displayed in the further region.

The setting mode can thus be restricted to the specific region of the touchscreen, while the transition mode or the status mode is activated in the further region, for which no operating intention, in particular no approach or touch, was detected.

By way of example, it is possible to detect that an actuation object enters a detection space in front of a touch-sensitive surface of a touchscreen, and the transition mode can be activated for the entire touchscreen. Afterward, a further manifestation of an operating intention, in particular a touch or a closer approach to the surface, can be detected and the setting mode can be activated in a region around the actuation object. In this case, one or a plurality of operable setting objects arranged in the region around the actuation object is or are displayed, while only the settability display elements, but no setting elements, can be displayed in further regions of the touchscreen.

In accordance with at least one disclosed embodiment, the setting element comprises a scale object and a pointer object, wherein a displacement of the pointer object relative to a direction of extent of the scale object is detected for the purpose of operating the setting element. This enables a simple and accurate setting of a value of the setting parameter.

The detection of a value on the basis of a displacement of a pointer object relative to the direction of extent of a scale object is known per se, but the exact arrangement and embodiment, both of the scale object and of the pointer object can be variable.

Provision can be made for the scale object to comprise an arrow representation. A simple setting of an intensity can be carried out as a result.

In the manner described, on the basis of a position of the pointer object relative to the direction of extent, it is possible to recognize simply what value is assumed by the setting parameter. In this case, provision can be made for there to be a proportional relationship between the position of the pointer object and the extent of the scale object. The direction of extent of the scale object is a longitudinal extent, wherein the scale object has an elongate shape.

For the case where the scale object comprises an arrow representation, the pointer object can have, for example, an arrowhead or a differently embodied arrow shape. The pointer object can furthermore have a line, wherein a difference between different states of the assigned setting parameter, for example, different states of a ventilation element, can be represented, for example, by a representation of lines or arrow shapes.

By way of example, a swiping gesture can be used for operating the setting element, wherein in the case of a touchscreen, for instance, a specific position is touched, a swiping gesture is thereupon performed, and the touch is subsequently ended at an end position. On the basis of the swiping gesture, that is to say the beginning and end positions, the direction of movement and the speed of movement, the input can be determined. Furthermore, the operation of the setting element can comprise an actuation of a rotary regulator, a sliding regulator and/or further operating elements embodied in analog or digital manner.

Furthermore, an arrow representation can be embodied such that, for instance, on the basis of a configuration of the area, for example, a whole or partial filling with a filling color serves for representing a flow rate. Furthermore, a three-dimensional or perspective effect can be represented, a course of the arrow representation into the represented vehicle interior being represented. An air flow from a ventilation element into the vehicle interior is represented as a result.

The operating apparatus of the type mentioned in the introduction comprises a detection unit, by which a current a value of a setting parameter of the air-conditioning apparatus is detectable, and an operating intention detection unit, by which an operating intention of a user is detectable. In this case, if no operating intention is detected, the status mode is activatable and, if an operating intention is detected, the transition mode or the setting mode is activatable. The operating apparatus furthermore comprises a control unit, by which, depending on the activated display mode, graphical data of a graphical representation of an interior of the vehicle are generatable, such that if the status mode is activated, the representation of the interior comprises a display element, by which the currently set value of the setting parameter is able to be output. Furthermore, the representation of the interior comprises, if the transition mode is activated, a settability display element and, if the setting mode is activated, an operable setting element. The operating apparatus additionally comprises a display unit, by which the graphical data are able to be displayed.

The disclosed operating apparatus is designed to implement the above-descried method. The disclosed operating apparatus thus has the same benefits as the disclosed method.

In the operating apparatus, the display element, the settability display element and the setting element are formed differently from one another. As a result, the different modes are detectable clearly for a user.

In accordance with at least one disclosed embodiment, the operating intention of the user is detectable by an approach detection apparatus, which the operating apparatus comprises, as approach of an actuation object to the display area as a result of an entrance of the actuation object into a detection region in front of the display area. As a result, the operating intention of the user can be detected by a spatial relationship being established between the actuation object and the displayed representation, in particular the represented display elements, settability display elements and/or setting elements. The display unit in this case has a touch-sensitive surface. A so-called touchscreen can be provided as a result.

By way of example, it is possible to arrange a film above the display area, with which the position of a touch by the actuation object can be detected, the latter being the fingertip of a user. The film can be embodied, for example, as a resistive touch film, a capacitive touch film or a piezoelectric film. Furthermore, the film can be embodied such that a heat flow emanating from the fingertip of a user, for example, is measured. Various inputs can be obtained from the temporal development of the touch of the film. By way of example, in the simplest case, it is possible to detect the touching of the film at a specific position and to assign it to a graphical object displayed on the display area, in particular a display element, a settability display element and/or a setting element. Furthermore, it is possible to detect the duration of the touch at a specific position or within a specific region.

In accordance with a further disclosed embodiment, the air-conditioning apparatus comprises at least one ventilation element, wherein if the setting mode is activated, an input is detectable on the basis of the setting element and a control signal for the air-conditioning apparatus is generatable on the basis of the input. In this case, the ventilation element of the air-conditioning apparatus is settable on the basis of the control signal.

As a result, it is possible to carry out a setting by which the ventilation element is provided as essential component of the air-conditioning apparatus.

Figure 1A:
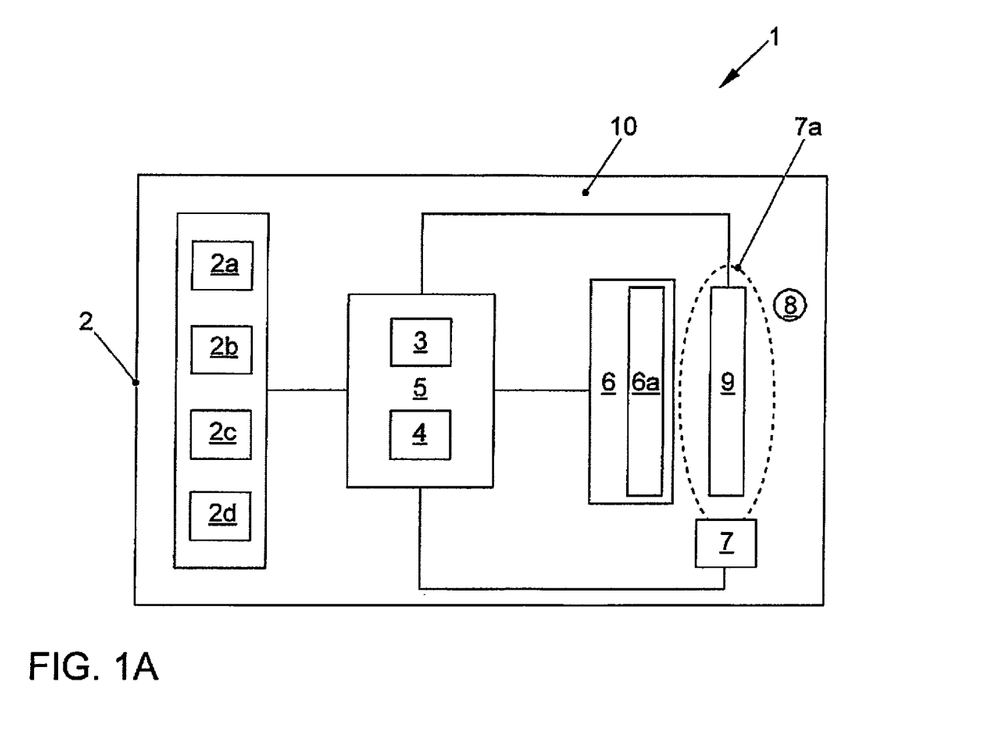
FIG. 1A shows a vehicle with an exemplary embodiment of the operating apparatus.

A vehicle with an exemplary embodiment of the disclosed operating apparatus is explained with reference to FIG. 1A.

A vehicle comprises an air-conditioning apparatus 2, which for its part comprises four ventilation elements 2a to 2d. In the exemplary embodiment, the ventilation elements 2a to 2d are provided at different locations in an interior 10 of the vehicle 1. In further exemplary embodiments, a different number of ventilation elements 2a to 2d can be provided; moreover, other devices of the air-conditioning apparatus 2 can be provided as an alternative or in addition to the ventilation elements 2a to 2d.

By means of the air-conditioning apparatus 2 air can be guided into the interior 10. In the exemplary embodiment, for this purpose a ventilation flap is provided for each of the ventilation elements 2a to 2d, the ventilation flap enabling the inflow of air from an exterior in the surroundings of the vehicle 1 into the interior 10. In this case, the ventilation elements are drivable in such a way that an air flow of a specific intensity, direction and temperature can be set in each case. In other exemplary embodiments, other setting possibilities can alternatively or additionally be provided.

The vehicle 1 furthermore comprises a control unit 5, which is coupled to the air-conditioning apparatus 2. The control unit 5, for its part, comprises a detection unit 3, by which data from the air-conditioning apparatus 2 are retrievable. The currently set values in each case of setting parameters of the air-conditioning apparatus 2 and of the ventilation elements 2a to 2d are detectable by the detection unit 3. The control unit 5 furthermore comprises an operating intention detection unit 4, by which an operating intention of a user is detectable, wherein data from further devices are evaluated. A display unit 6 having a display area 6a is furthermore coupled to the control unit 5. In addition, a touch-sensitive surface 9 is arranged in front of the display area 6a, the touch-sensitive surface in turn being coupled to the control unit 5. Furthermore, an approach detection device 7 is arranged in a region in the vicinity of the display area 6a such that an approach is detectable in a detection region 7a in front of the display area 6a. Furthermore, an actuation object 8, which is a user's finger in the exemplary embodiment, is situated in the vehicle interior 10.

The approach detection device 7 can detect when the actuation object 8 enters the detection region 7a or when it is situated therein. Provision is furthermore made for the approach to be detected in a spatially resolved manner, that is to say that a position of the actuation object 8 in the detection region 7a is assigned an approach position on the display area 6a. That is to say that before the touch-sensitive surface 9 is touched, a position relative to the display area 6a is determined by the approach detection device 7. In this case, the approach detection is carried out in a manner known per se.

Graphical elements such as can be displayed by the disclosed method are explained with reference to FIG. 1B. Designations used in the further course of the description are introduced here.

An arrow 12 is provided as the basic shape of a graphical element for supporting the operation by a user. The arrow has an area and also a direction of extent in the direction of the arrowhead. The base of the arrow is formed by a line 11. In this case, it is possible to display the line 11 at an arbitrary position relative to the direction of extent of the arrow 12. Furthermore, a tip 13 is provided, the shape of which follows the arrowhead of the arrow 12 and which is illustrated here parallel thereto at the end of the arrow 12. Furthermore, two parallel lines 14 in proximity to one another and two parallel tips 15 in proximity to one another can be represented.

An example of a representation generated by the disclosed method in the display mode is explained with reference to FIG. 2. In this case, the system described above with reference to FIG. 1A and the graphical elements described with reference to FIG. 1B are taken as a departure point.

A representation 10 is generated by the control unit 5 and displayed on the display area 6a by the display unit 6. A view of the interior 10 of the vehicle 1 is represented, a view from the rear into the front region of the vehicle, in particular looking at the dashboard with a multiplicity of outlet elements 25.1 to 25.6, being represented in a perspective manner. The exemplary embodiment provides for a ventilation element 2a to 2d of the air-conditioning apparatus 2 to be assigned to each of the outlet elements 25.1 to 25.6 shown in the representation 20.

The currently set parameters of the ventilation elements 2a to 2d are detected by the detection unit 3, wherein what is detected is whether the ventilation flaps assigned to the ventilation elements 2a to 2d are open or closed and also the temperature and intensity with which an air flow is guided into the interior 10 of the vehicle 1 by the ventilation elements 2a to 2d.

Figure 2:
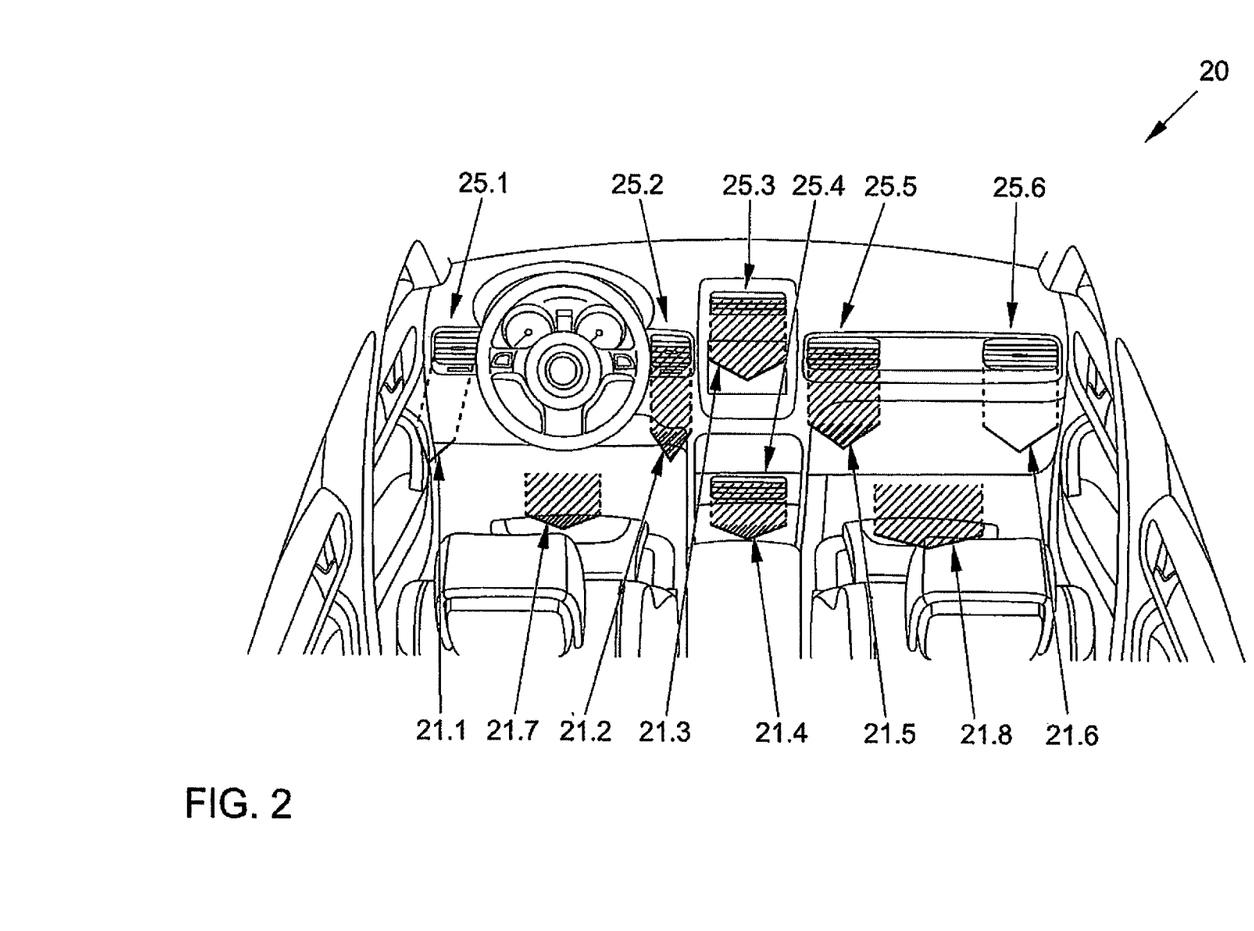
FIG. 2 shows and example of a representation generated by the disclosed method in the display mode.

Since no operating intention of a user is detected in the case shown in FIG. 2, the status mode is activated as display mode of the air-conditioning apparatus.

Display elements 21.1 to 21.8 are arranged on the outlet elements 25.1 to 25.6 of the representation 20. The display elements 21.1 to 21.8 have the shape of an arrow 12, as explained above with reference to FIG. 1B. They may differ in length, width and color configuration. By means of a hatching present or absent, FIG. 2 indicates that individual display elements 21.1, 21.6 have no filling color. The remaining display elements 21.1 to 21.8 have a filling color. In this case, the exemplary embodiment provides for the color to be dependent on the temperature of the inflowing air flow. Furthermore, the contours of the arrows can likewise be configured in the same color.

In further exemplary embodiments, other forms of representation can be provided; in particular, other means of highlighting and characterizing the display elements 21.1 to 21.8 can be used to represent different manifestations and settings of the assigned ventilation elements 2a to 2d.

In the case shown in FIG. 2, no air flows into the interior 10 of the vehicle 1 through the laterally outer ventilation elements, which are represented here by the outlet elements 25.1, 25.6. This is represented by the filling color of the assigned display elements 21.1, 21.6 being dispensed with. Furthermore, provision can be made for a neutral color, for example, to be used as filling color. Furthermore, it is possible to represent further effects, such as, for example, effects of mirroring on a partial area.

In the exemplary embodiment illustrated, provision is made for the arrows of the display elements 21.1 to 21.8 to be represented in a perspective manner, thus giving rise to an impression of directions of movement which are indicated by the arrows and which correspond to the inflow of air through the outlet elements 25.1 to 25.6.

An example of a representation generated by the disclosed method in the transition mode is explained with reference to FIG. 3. In this case, the operating apparatus described above with reference to FIGS. 1A and 1B and FIG. 2 is taken as a departure point.

Figure 3:
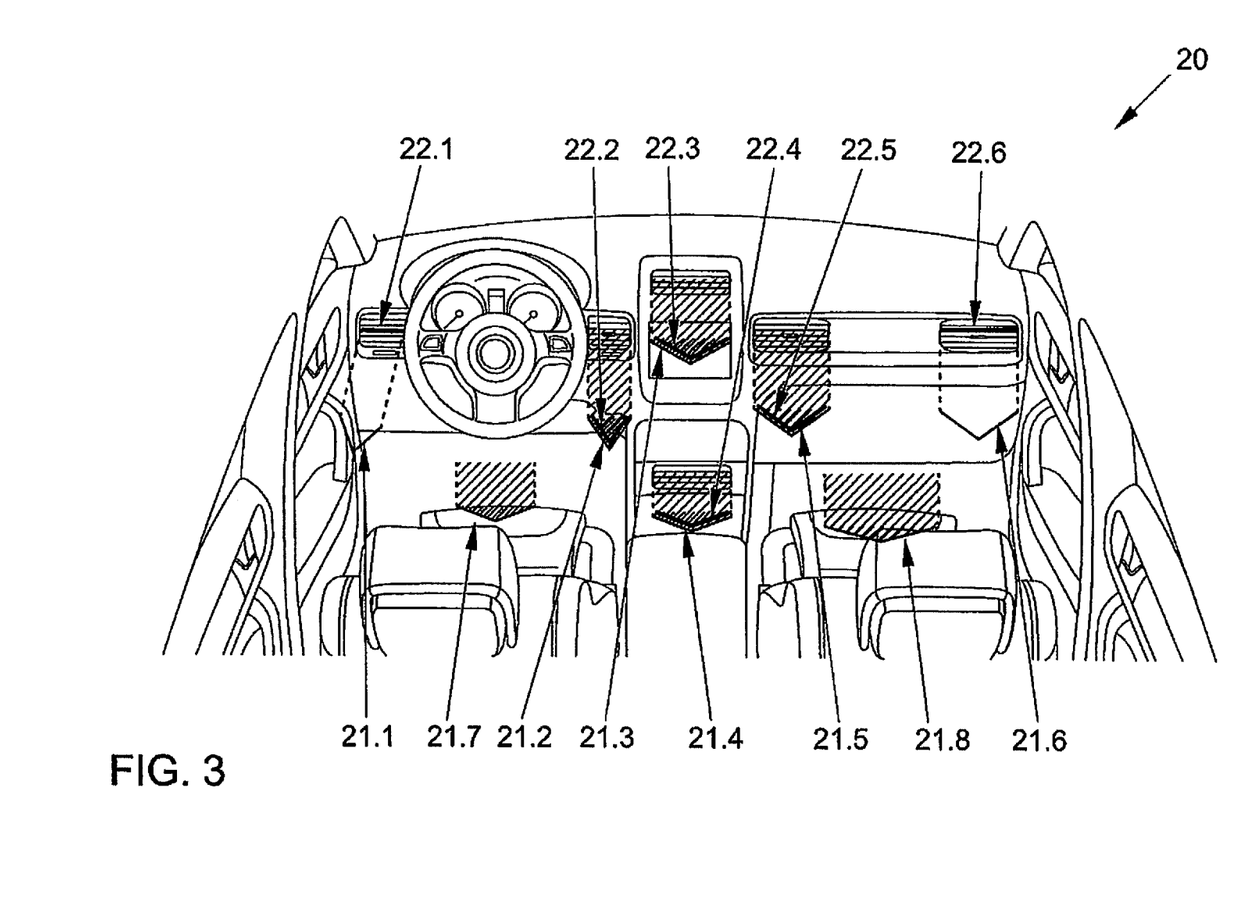
FIG. 3 shows an example of a representation generated by the disclosed method in the transition mode.

In the case shown in FIG. 3, the approach detection device 7 has detected that the actuation object 8 has entered the detection region 7a. The transition mode is therefore activated as display mode of the air-conditioning apparatus 2.

The representation 20 is firstly formed in a manner similar to that explained above for FIG. 2 in the case of the status mode. Supplementarily, settability display elements 22.1 to 22.6 are now represented. These can be embodied as tips or lines, for instance, like the tip 13 and the line 11 in FIG. 1B. The settability display elements 22.1 to 22.6 are represented in a manner arranged on the display elements 21.1 to 21.6. Two of the display elements 21.7, 21.8 shown in FIG. 3 are not supplemented by such settability display elements, since no settings can be performed here.

The settability display elements 22.1 to 22.6 are formed as tips in the cases (22.2 to 22.5), in which an air flow streams in. They are represented as a line, moreover, if the ventilation flap of the assigned ventilation element 2a to 2d is closed and, therefore, no air can stream in. In the exemplary embodiment, the settability display elements 22.1 to 22.6 are arranged along the longitudinal extent of the display elements 21.1 to 21.6 such that a tip is represented (22.2 to 22.5) if an air flow is generated, wherein the tip is arranged at the arrowhead of the display element 21.2 to 21.5 and is arranged either in a manner covering the arrowhead or parallel thereto. Furthermore, the settability display element 22.1, 22.6 is represented as a line at the base of the arrow of the display element 21.1, 21.6 if the ventilation flap is closed. In this case, the arrow of the display element 21.1, 21.6 is transparent or has a different color.

Upon transition from the status mode to the transition mode, the settability display elements 22.1 to 22.6 may appear in addition to the display elements 21.1 to 21.8. Alternatively or additionally, it is possible to output a transition between the representations in which, for example, the display elements 21.1 to 21.8 disappear and the settability display elements 22.1 to 22.6 appear. The representation in the transition mode can also be formed such that it no longer comprises display elements 21.1 to 21.8 but rather only the settability display elements 22.1 to 22.6.

An example of a representation generated by the disclosed method in the setting mode is explained with reference to FIGS. 4A, 4B and 4C. In this case, the operating apparatus described above with reference to FIGS. 1A and 1B and FIG. 2 is taken as a departure point.

Figures 4A, 4B, 4C:
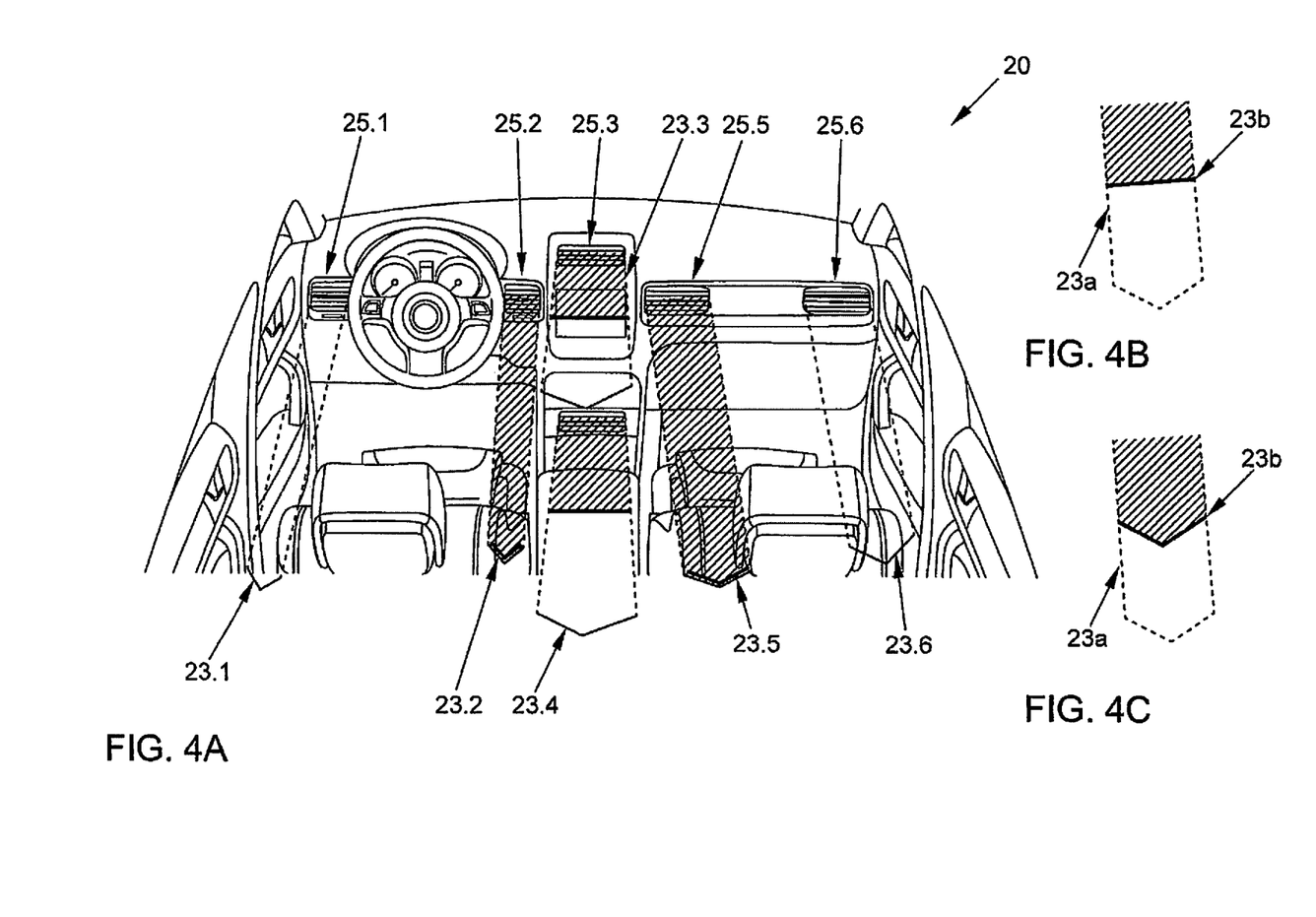
FIGS. 4A, 4B and 4C show an example of a representation generated by the disclosed method in the setting mode.

In the case shown in FIG. 4A, an actuation by the actuation object 8 was detected. In the exemplary embodiment, this is a touch of the touch-sensitive surface 9 by a finger of the user. The setting mode is therefore activated as display mode of the air-conditioning apparatus 2. The representation 20 changes by virtue of the arrows that proceed from the outlet elements 20.1 to 20.6 being enlarged by means of an animation, thus giving rise to the impression that they grow into the representation 20 of the vehicle interior. A transformation of the settability display elements 22.1 to 22.6 to setting elements 23.1 to 23.6 is achieved in this case.

In further exemplary embodiments, the actuation can be detected in some other way, for instance, if the distance of the actuation object 8 falls below a specific distance from the touch-sensitive surface 9. Furthermore, other operating actions can be detected as actuation, for instance, a specific gesture, a voice command or keeping the actuation object 8 over a specific position of the touch-sensitive surface 9 for longer than a specific time.

The configuration of the setting elements 23.1 to 23.6 is explained in greater detail with reference to FIGS. 4B and 4C.

An arrow shape is provided, wherein the area of the arrow can be wholly or partly occupied by a filling color, or may have no filling color. The arrow shape has a longitudinal extent and a pointer object 23b is arranged along the longitudinal extent of the arrow shape such that the arrow shape itself as scale object 23a allows a quantitative outputting of the value of a setting parameter that is represented by the setting element 23.1 to 23.6.

In the case illustrated in FIG. 4C, it is provided here that the user with the actuation object 8 is situated in a specific closer vicinity of the represented setting element 23.1 to 23.6. The pointer object 23b changes from the representation of a line in FIG. 4B to the representation of a tip in FIG. 4C. This represents the fact that operation of the setting element 23.1 to 23.6 can now be performed since the pointer element 23b has now changed from a pure display function to a setting function.

In further exemplary embodiments, it is possible to provide a different change in the representation upon the approach of the actuation object 8, for example, a change in color of the setting element 23.1 to 23.8, a dynamic effect of a temporarily variable representation and/or some other change in representation with respect to the setting element 23.1 to 23.6, as a result of which a change in relation to the other setting elements 23.1 to 23.6 is achieved.

In the case illustrated in FIG. 4A, it is provided that the outer lateral setting elements 23.1, 23.6 represent a state of the assigned ventilation elements 2a to 2d in which the ventilation flaps are closed. The arrow shapes are represented in a transparent manner, and the scale element 23b is represented as a line at the base of the arrow shape of the setting element 23.1, 23.6.

In the case of the further setting elements 23.2 to 23.5, it is provided that an air flow streams into the interior 10 of the vehicle 1, that is to say that, in the associated representation of the setting elements 23.2 to 23.5, the arrow shape is wholly or partly covered by a filling color. In the case of the two central outlet elements 25.3, 25.4, setting elements 23.3, 23.4 are respectively arranged which indicate that the inflowing air flow has not yet reached its full intensity. The area of the arrow shape is only partly filled by a filling color, while the rest of the area is represented in a transparent manner. The transition between filled and non-filled area is designated by the pointer element 23b, which is embodied here as a line.

Furthermore, here the pointer element 23b is represented such that the intensity of the inflowing air results from the arrangement relative to the longitudinal extent of the arrow shape. In the case of the setting elements 23.2, 23.5 for which an inflowing air flow with full intensity is represented, the entire arrow shape is filled by the filling color, and the pointer element 23b is embodied as a tip and represented at the arrowhead of the setting element 23.2, 23.5. In this case, provision can be made for the pointer element 23b to cover the tip of the arrow shape or to be represented parallel thereto.

In further exemplary embodiments, it can be provided that the position of the approach of the actuation object 8 cannot be detected in a spatially resolved manner, that is to say that in this case it is not provided that only a specific setting element 23.1 to 23.6 changes to indicate the possibility of a setting, while the further settability display elements 22.1 to 22.6 and/or display elements 21.1 to 21.8 remain unchanged.

It is provided that a user can now carry out a setting by means of the actuation object 8 by making a swiping gesture from a position of a pointer element 23b along the longitudinal extent of an arrow shape of a setting element 23.1 to

23.6. In this case, the endpoint of the swiping gesture is the new position of the pointer element 23b along the longitudinal extent of the setting element 23.1 to 23.6. Furthermore, provision can be made for the setting to be effected by means of tapping the setting element at a specific position, wherein in this case the position of tapping is treated like the end position of the swiping gesture and therefore represents the new position of the pointer element 23b.

Furthermore, it can be provided, if a ventilation flap is closed, that the ventilation flap can be opened by tapping on the pointer object 23b, which is represented as a line at the base of the setting element 23.1, 23.6.

An example of a representation generated by the disclosed method in the status mode with deactivated ventilation in the head region is explained with reference to FIG. 5. In this case, the operating apparatus described above with reference to FIGS. 1A and 1B and FIG. 2 is taken as a departure point.

Figure 5:
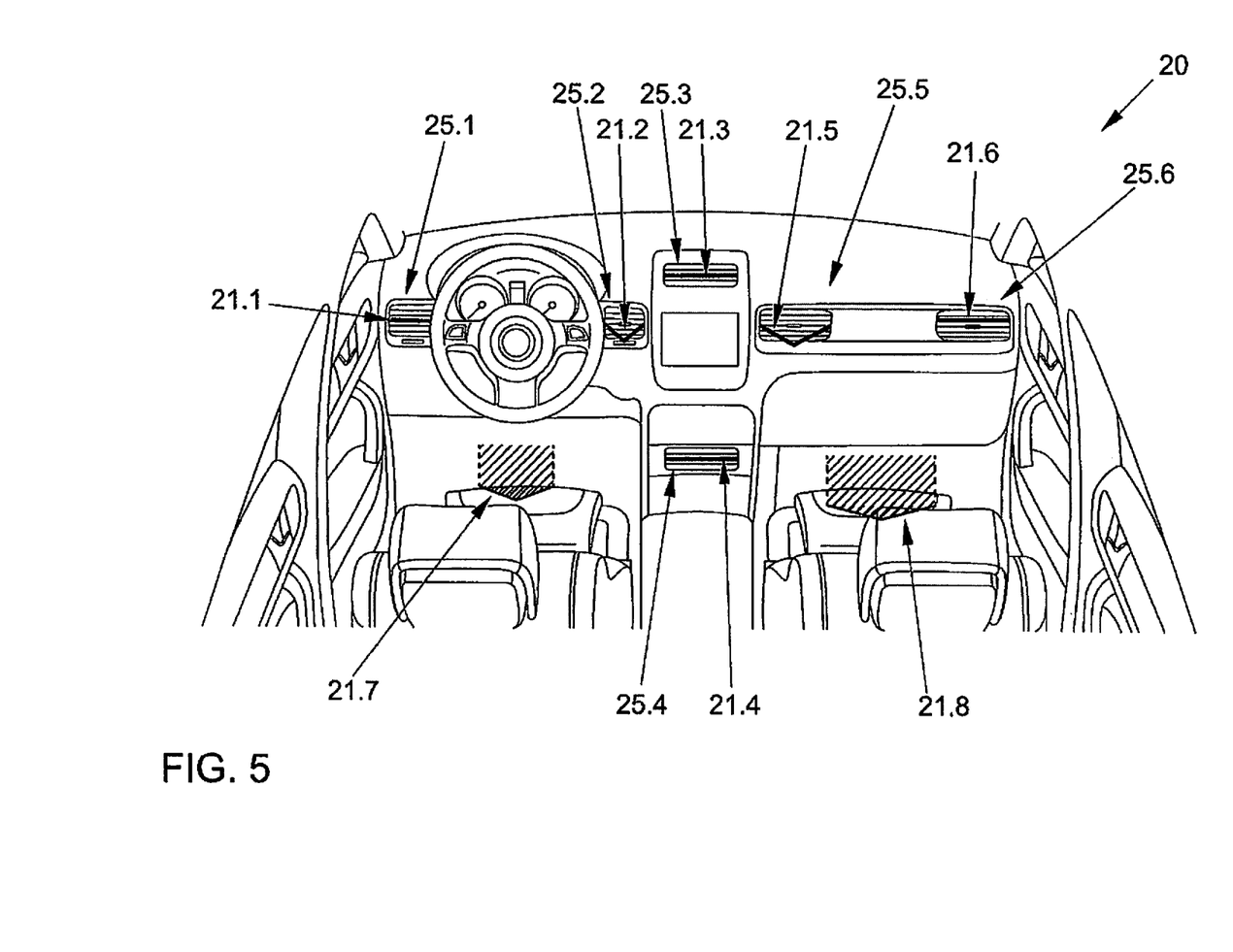
FIG. 5 shows an example of a representation generated by the disclosed method with deactivated ventilation in the head region in the status mode.

In the case illustrated in FIG. 5, it is provided that the status mode of the air-conditioning apparatus 2 is activated. In this case, the air-conditioning apparatus 2 has been configured such that the head ventilation, represented here on the basis of the outlet elements 25.1 to 25.6, has been deactivated, while outlet elements (not illustrated) in the foot region are simultaneously activated. For activating and deactivating the ventilation in the head or foot region and in further regions of the vehicle interior, it is possible to detect user inputs, for instance, by means of buttons of the representation and/or analog switches or further input apparatuses.

Figure 1B:
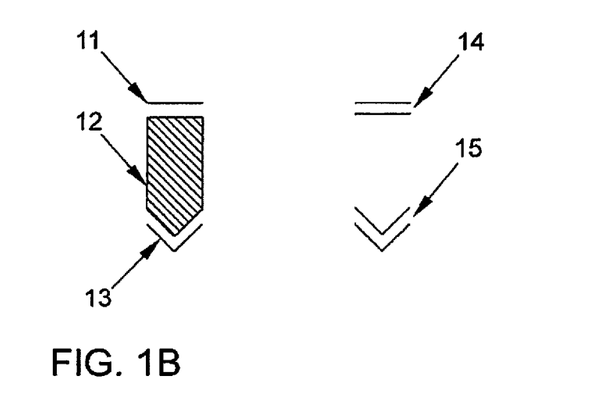
FIG. 1B shows graphical elements that can be displayed by the disclosed method.

These settings are represented such that the display elements 21.7, 21.8 represented in the foot region are embodied as arrow shapes, while the display elements 21.1 to 21.6 assigned to the outlet elements 25.1 to 25.6 are represented merely as lines or tips, comparable to the tips 13 and lines 11 illustrated in FIG. 1B. In this case, a line is displayed when the assigned ventilation flap is closed, and a tip is displayed when the ventilation flap is open.

An example of a representation generated by the disclosed method with deactivated ventilation in the head region in the transition mode is explained with reference to FIG. 6. In this case, the operating apparatus described above with reference to FIGS. 1A and 1B and FIG. 2 is taken as a departure point.

Figure 6:
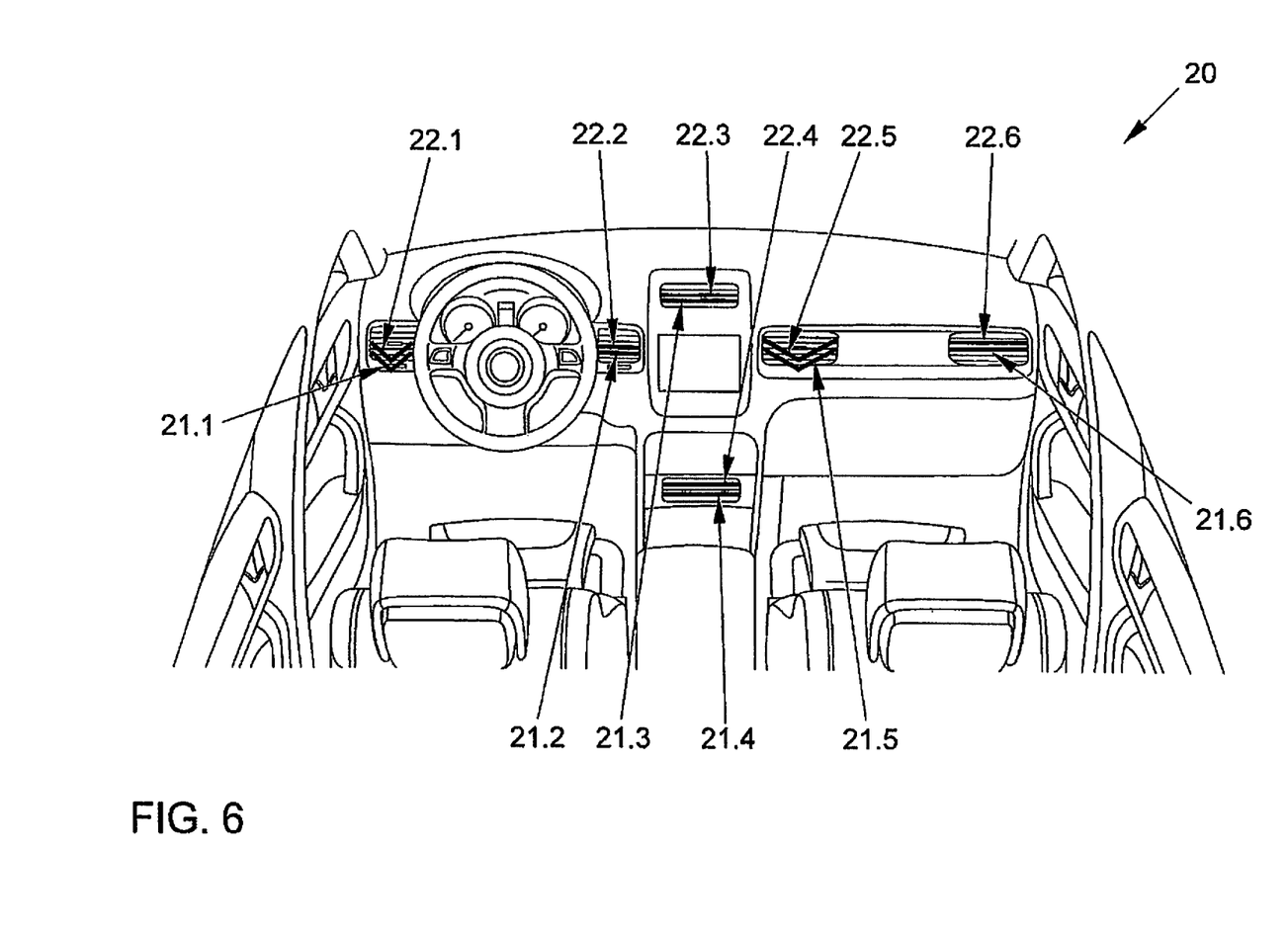
FIG. 6 shows an example of a representation generated by the disclosed method with deactivated ventilation in the head region in the transition mode.

In the case illustrated in FIG. 6, it is assumed that the actuation object 8 entered the detection region 7a and an approach was therefore detected. The transition mode was therefore activated as display mode of the air-conditioning apparatus 2.

In this exemplary embodiment, it is provided that the display elements 21.7, 21.8 in the footwell as illustrated above in FIG. 5 are no longer displayed since they are not operable. The display elements 21.1 to 21.6 reduced to lines and tips as already explained above are displayed and lines and tips in proximity thereto are represented as settability display elements 22.1 to 22.6.

In a further exemplary embodiment, it is provided that the display remains substantially the same upon the transition to the setting mode, with the use of the parallel represented lines and arrows of the display elements 21.1 to 21.6 and settability display elements 22.1 to 22.6 as lines in proximity and arrows in proximity as setting elements 23.1 to 23.6. Opening or closing of the assigned ventilation flaps can be carried out by tapping.

In a further exemplary embodiment, spatially resolved approach detection can be provided, which makes it possible to detect what region or what position of the display area 6a the actuation object 8 is approaching. The transition mode can then be activated in this region or in a defined region around this position, while the status mode is activated for other regions of the display area 6a. That is to say that the settability display elements 22.1 to 22.6 are displayed in the region, while they are not displayed in the remaining regions of the display area 6a. In this case it is also possible to detect if the actuation object 8 moves over the display area 6a, and the region in which the transition mode is activated can be displaced in a manner corresponding to the position of the actuation object 8. As a result, a user can search for the operating possibilities in specific regions, while the further regions remain unchanged.

In an analogous manner it is possible to activate the setting mode for a specific region of the display area 6a, particularly if the actuation is detected in a spatially resolved manner with a relation to a specific position of the display area 6a.

| List of Reference Signs | |
|---|---|
| 1 | Vehicle |
| 2 | Air-conditioning apparatus |
| 2a; 2b; 2c; 2d | Ventilation element |
| 3 | Detection unit |
| 4 | Operating intention detection unit |
| 5 | Control unit |
| 6 | Display unit |
| 6a | Display area |
| 7 | Approach detection device |
| 7a | Detection region |
| 8 | Actuation object |
| 10 | Interior |
| 11 | Line |
| 12 | Arrow |
| 13 | Tip |
| 14 | Line in proximity |
| 15 | Tip in proximity |
| 20 | Graphical representation |
| 21.1; 21.1; 21.3; 21.4; 21.5; 21.6; 21.7; 21.8 | Display element |
| 22.1; 22.2; 22.3; 22.4; 22.5; 22.6 | Settability display element |
| 23.1; 23.2; 23.3; 23.4; 23.5; 23.6 | Setting element |
| 23a | Scale object |
| 23b | Pointer object |
| 25.1; 25.2; 25.3; 25.4; 25.5; 25.6 | Outlet elements |

The invention claimed is:

1. A method for operating an air-conditioning apparatus of a motor vehicle, the air-conditioning apparatus having at least three display modes including a status mode, a transition mode and a setting mode, the method comprising:
   detecting a current value of a setting parameter of the air-conditioning apparatus;
   detecting for an operating intention and an actuation action of a user; and
   displaying a graphical representation of at least a portion of an interior of the motor vehicle,
   wherein a display element indicating the current value of the setting parameter is displayed on the representation of the interior in response to the status mode being activated, a settability display element indicating an ability to adjust the current value of the setting parameter is displayed on the representation of the interior in response to the transition mode being activated, an operable setting element configured to allow adjustment of the current value of the setting parameter is displayed on the representation of the interior in response to the setting mode being activated, the status mode is activated in response to no operating intention being detected, the transition mode is activated in response to the operating intention being detected, and the setting mode is activated in response to the actuation action being detected.

2. The method of claim 1, wherein the display element, the settability display element and the setting element are embodied differently from one another.

3. The method of claim 1, wherein, in response to the setting mode being activated, an input is detected based on an interaction of the user with the setting element and a control signal for the air-conditioning apparatus is generated based on the input, and wherein the setting parameter of the air-conditioning apparatus is adjusted based on the control signal.

4. The method of claim 3, wherein an open state and a closed state of a ventilation element of the air-conditioning apparatus are set based on the control signal.

5. The method of claim 4, wherein, in response to the status mode being activated, the display element indicates the open or closed state of the ventilation element.

6. The method of claim 5, wherein the open state of the ventilation element is indicated by a transparent arrow, and wherein the closed state of the ventilation element is indicated by a filled arrow.

7. The method of claim 3, wherein the display element, the setting element and the settability display element are arranged in each case at a position of the representation of the interior which corresponds to an actual position of the ventilation element in the motor vehicle.

8. The method of claim 1, wherein the value of the setting parameter is indicated by the display element based on at least one of a color and a longitudinal extent of the display element.

9. The method of claim 1, wherein the detected operating intention comprises an approach of an actuation object within a detection space.

10. The method of claim 1, wherein, in response to the transition mode being activated, the settability display element is displayed together with the display element, wherein the settability display element is arranged on the display element.

11. The method of claim 1, wherein, in response to the setting mode being activated, an approach position of an actuation object relative to the representation of the interior is determined and the operable setting element is formed based on the approach position.

12. The method of claim 1, wherein the setting element comprises a scale object and a pointer object, wherein a displacement of the pointer object relative to a direction of extent of the scale object is detected for operating the setting element.

13. The method of claim 1, wherein the display element is an arrow, and wherein the settability display element is at least one of a base line and a tip of the arrow.

14. The method of claim 1, wherein the display element is at least one of a base line and an arrow tip, and wherein the settability display element is at least one of a double base line and a double arrow tip.

15. An operating apparatus for operating an air-conditioning apparatus of a motor vehicle, the air-conditioning apparatus having at least three display modes including a status mode, a transition mode, and a setting mode, the operating apparatus comprising:
a detection unit configured to detect a current value of a setting parameter of the air-conditioning apparatus;
an operating intention detection unit configured to detect for an operating intention and an actuation action of a user;
a display unit configured to display a graphical representation of at least a portion of an interior of the motor vehicle; and
a control unit,
wherein the control unit is configured to display a display element indicating the current value of the setting parameter on the display unit over the representation of the interior in response to the status mode being activated, to display a settability display element indicating an ability to adjust the current value of the setting parameter on the display unit over the representation of the interior in response to the transition mode being activated, and to display an operable setting element configured to allow adjustment of the current value of the setting parameter on the display unit over the representation of the interior in response to the setting mode being activated, the status mode is activated in response to no operating intention being detected, the transition mode is activated in response to the operating intention being detected, and the setting mode is activated in response to the actuation action being detected.

16. The operating apparatus of claim 15, further comprising an approach detection device configured to detect for the approach of an actuation object toward the display unit and signal to the operating intention detection unit the operating intention as a result of an entrance of the actuation object into a detection region in front of the display unit.

17. The operating apparatus of claim 15, wherein, in response to the setting mode being activated, an input is detectable based on an interaction of the user with the setting element and a control signal for the air-conditioning apparatus is generatable based on the input, and wherein the setting parameter of the air-conditioning apparatus is adjustable based on the control signal.

18. The operating apparatus of claim 17, further comprising at least one ventilation element, wherein an open state and a closed state of the ventilation element are set based on the control signal, and wherein, in response to the status mode being activated, the display element indicates the open or closed state of the ventilation element.

19. The operating apparatus of claim 18, wherein the open state of the ventilation element is indicated by a transparent arrow, and wherein the closed state of the ventilation element is indicated by a filled arrow.

20. The operating apparatus of claim 15, wherein the display element is an arrow, and wherein the settability display element is at least one of a base line and a tip of the arrow.

21. The operating apparatus of claim 15, wherein the display element is at least one of a base line and an arrow tip, and wherein the settability display element is at least one of a double base line and a double arrow tip.

22. The operating apparatus of claim 15, wherein the value of the setting parameter is indicated by the display element based on at least one of a color and a longitudinal extent of the display element.

23. The operating apparatus of claim 15, wherein, in response to the transition mode being activated, the settability display element is displayed together with the display element, wherein the settability display element is arranged on the display element.

24. The operating apparatus of claim 15, wherein, in response to the setting mode being activated, an approach position of an actuation object relative to the representation of the interior is determined and the operable setting element is formed based on the approach position.

25. The operating apparatus of claim 15, wherein the setting element comprises a scale object and a pointer object, wherein a displacement of the pointer object relative to a direction of extent of the scale object is detected for operating the setting element.

* * * * *